US012410040B1

(12) United States Patent
Napieralski et al.

(10) Patent No.: US 12,410,040 B1
(45) **Date of Patent: *Sep. 9, 2025**

(54) TELESCOPING CRANE AND RELATED METHODS

(71) Applicant: OZ Lifting Products, LLC, Winona, MN (US)

(72) Inventors: Steve Napieralski, Winona, MN (US); Gregory Lucas, La Crescent, MN (US)

(73) Assignee: OZ Lifting Products, LLC, Winona, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,480

(22) Filed: Sep. 22, 2022

Related U.S. Application Data

(63) Continuation of application No. 16/567,344, filed on Sep. 11, 2019, now Pat. No. 11,453,578.

(51) Int. Cl.

| | |
|---|---|
| ***B66C 23/70*** | (2006.01) |
| ***B66C 23/04*** | (2006.01) |
| ***B66C 23/16*** | (2006.01) |
| *B66C 23/06* | (2006.01) |

(52) U.S. Cl.
CPC ............ *B66C 23/706* (2013.01); *B66C 23/04* (2013.01); *B66C 23/166* (2013.01); *B66C 23/06* (2013.01)

(58) Field of Classification Search
CPC ....... B66C 23/04; B66C 23/166; B66C 23/06; B66C 23/701; B66C 23/706
See application file for complete search history.

(56) References Cited

U.S. PATENT DOCUMENTS

| | | | | |
|---|---|---|---|---|
| 3,326,391 | A * | 6/1967 | Torbjorn | B66C 23/706 212/231 |
| 3,638,806 | A | 2/1972 | Hippach | |
| 3,690,742 | A | 9/1972 | Sung | |
| 3,961,713 | A | 6/1976 | Stine | |
| 4,258,853 | A | 3/1981 | Gill et al. | |
| 4,298,128 | A | 11/1981 | Gattu | |
| 4,337,868 | A * | 7/1982 | Gattu | B66C 23/706 52/632 |
| 4,406,375 | A * | 9/1983 | Hockensmith | B66C 23/701 212/348 |
| 4,440,261 | A | 4/1984 | Clark | |
| 6,401,863 | B1 | 6/2002 | Kirkland | |
| 6,481,587 | B2 | 11/2002 | Higgins | |
| 6,626,126 | B1 | 9/2003 | Kalve | |
| 7,070,059 | B1 | 7/2006 | Flowers et al. | |
| 9,630,816 | B1 | 4/2017 | Napieralski et al. | |
| 10,287,138 | B2 | 5/2019 | Italiano | |
| 2010/0111661 | A1 | 5/2010 | Svanda | |
| 2022/0194760 | A1* | 6/2022 | Kim | B66F 3/10 |

FOREIGN PATENT DOCUMENTS

| | | | | |
|---|---|---|---|---|
| CN | 104404990 | A * | 3/2015 | E02F 3/39 |
| EP | 2078693 | A1 | 7/2009 | |
| WO | 2004056692 | A1 | 7/2004 | |

* cited by examiner

*Primary Examiner* — Anna M Momper
*Assistant Examiner* — Nathaniel L Adams
(74) *Attorney, Agent, or Firm* — IPTechLaw

(57) ABSTRACT

Implementations of cranes may include a first telescoping boom and a second telescoping boom coupled within the first telescoping boom. The second telescoping boom may be entirely within the first telescoping boom when the second telescoping boom is in a fully extended position.

12 Claims, 7 Drawing Sheets

TELESCOPING CRANE AND RELATED METHODS

CROSS REFERENCE TO RELATED APPLICATIONS

This application is a continuation application of the earlier U.S. Utility Patent Application to Napieralski entitled "Telescoping Crane and Related Methods," application Ser. No. 16/567,344, filed Sep. 11, 2019, now pending, the disclosure of which is hereby incorporated entirely herein by reference.

BACKGROUND

1. Technical Field

Aspects of this document relate generally to cranes. More specific implementations involve davit cranes.

2. Background

Cranes are used in a variety of industries. Cranes can hold, lift, lower, or move a load to another location. Various types of cranes exist, such as side lift cranes, overhead cranes, mobile cranes, all terrain cranes, and railroad cranes. Many cranes require wire, rope, chain or cable which sits in a sheave to lower or lift a load.

SUMMARY

Implementations of cranes may include a first telescoping boom and a second telescoping boom coupled within the first telescoping boom. The second telescoping boom may be entirely within the first telescoping boom when the second telescoping boom is in a fully extended position.

Implementations of cranes may include one, all, or any of the following:

The crane may be a davit crane.

The first telescoping boom may include a cylindrical tube.

The second telescoping boom may include a rectangular tube.

The first telescoping boom and the second telescoping boom may include a composite material.

The first telescoping boom and the second telescoping boom may be configured to telescope under a load.

Implementations of cranes may include a mast coupled to an outer telescoping boom, an inner telescoping boom coupled within the outer telescoping boom, a threaded rod rotatably coupled within the inner telescoping boom, and a sheave coupled to the outer telescoping boom. The crane may be configured to telescope under a load. The maximum distance the crane is configured to telescope may be equal to a maximum distance the outer telescoping boom is configured to telescope.

Implementations of cranes may include one, all, or any of the following:

The outer telescoping boom may include a first outer sleeve and a first inner sleeve and the inner telescoping boom may include a second outer sleeve and a second inner sleeve. The first outer sleeve may be fixedly coupled to the second outer sleeve and the first inner sleeve may be fixedly coupled to the second inner sleeve.

The outer telescoping boom may be configured to telescope a same amount as the inner telescoping boom when the crane telescopes.

The crane may be configured to telescope under a load.

The mast, the outer telescoping boom, and the inner telescoping boom may include composite materials.

The crane may be a davit crane.

Implementations of cranes may include a mast coupled to a boom support and a first telescoping boom coupled within the boom support. The first telescoping boom may include a first outer sleeve and a first inner sleeve. The first inner sleeve may be configured to fit within the first outer sleeve. The crane may also include a second telescoping boom coupled within the first telescoping boom. The second telescoping boom may include a second outer sleeve and a second inner sleeve. The second inner sleeve may be configured to fit within the second outer sleeve. The crane may also include a threaded nut fixedly coupled to the second inner sleeve and a threaded rod rotatably coupled within the threaded nut. The crane may be configured to telescope through rotation of the threaded rod. The first inner sleeve may be fixedly coupled to the second inner sleeve. The first outer sleeve may be fixedly coupled to the second outer sleeve.

Implementations of cranes may include one, all, or any of the following:

The crane may be configured to telescope under a load.

The boom support may include a first side plate, a second side plate, and a top plate. The first side plate and the second side plate may each include a protrusion configured to fit within a corresponding slot within the top plate.

A winch may be configured to directly couple to the boom support.

A cross section of the first telescoping boom may be circular.

A cross section of the second telescoping boom may be rectangular.

The crane may include a pin configured to be received by the boom support and the mast. The pin may be configured to couple to the boom support to the mast.

The boom support may include a closed opening in a first plate of the boom support and a slot in a second plate of the boom support. The pin may be configured to extend within the closed opening and within the slot.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended cranes will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such cranes, and implementing components and methods, consistent with the intended operation and methods.

The implementations of the cranes disclosed herein may be davit cranes, and may be configured to mount to, by non-limiting example, a vehicle, a rooftop, or next to a waterway. While the implementations disclosed herein primarily relate to davit cranes, it is understood that the elements of the cranes disclosed herein may be applied to other types of cranes. Further, any of the types of cranes and elements thereof disclosed in U.S. Pat. No. 9,630,816 (hereinafter '816), issued to Steve Napieralski on Apr. 25, 2017, the disclosure of which is hereby incorporated entirely herein by reference, may also be incorporated into the implementations of cranes disclosed herein.

Figure 1:
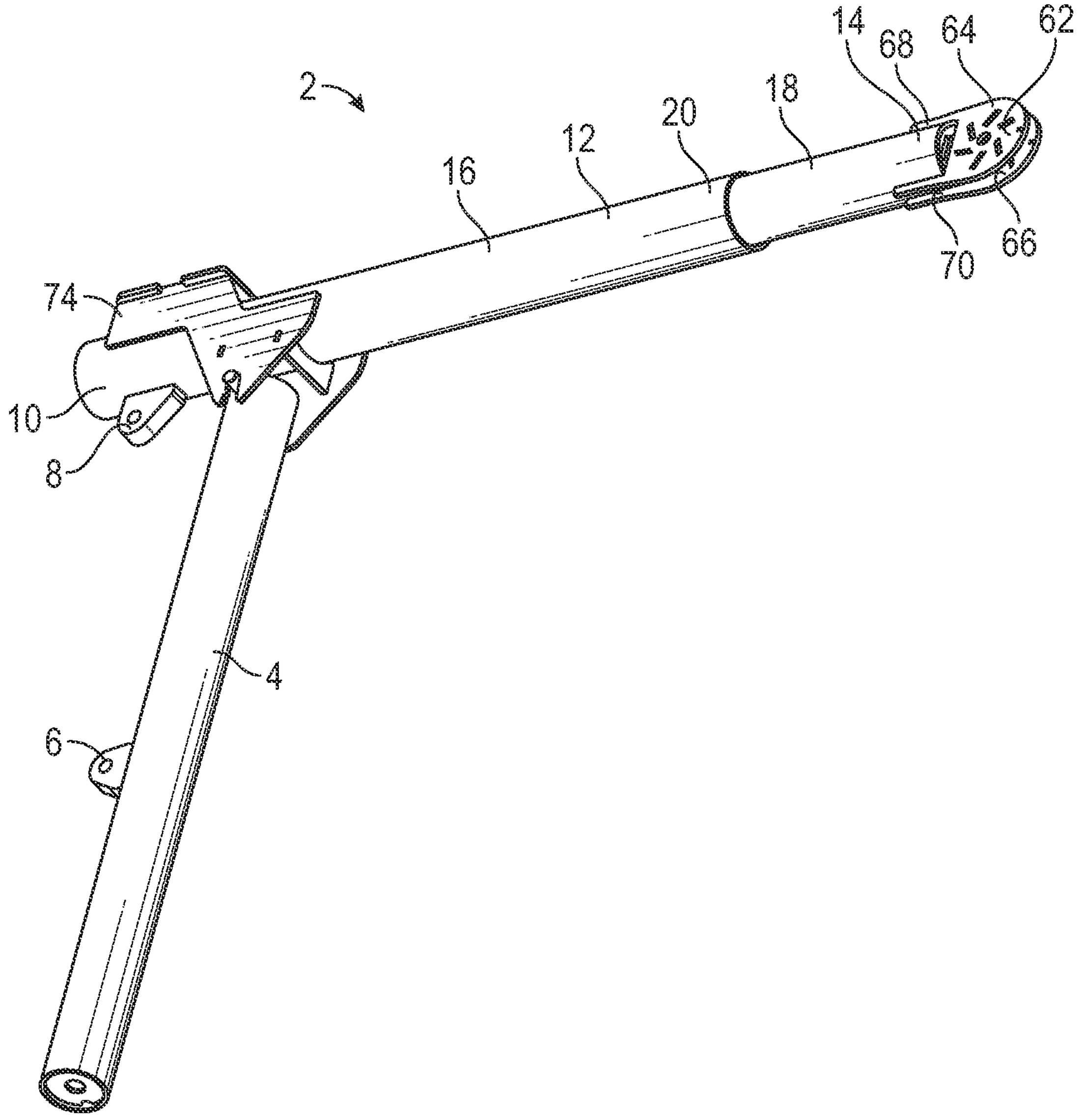
FIG. 1 is a perspective view of a crane.

Referring to FIG. 1, a perspective view of a crane is illustrated. The crane 2 includes a mast 4. The mast 4 may be made from, by non-limiting example, steel, other metals, a composite material (including any composite material disclosed herein, including in '816), any other material, or any combination thereof. As illustrated, the mast 4 may include a cylindrical or cylindrical tube shape. In other implementations, the mast 4 may include a rectangular prism or rectangular tube shape. In various implementations, the mast 4 may be a hollow tube or may be solid/filled. In various implementations, the mast may be configured to rotate when it is secured to a surface or may be rotatably fixed to a surface.

As illustrated by FIG. 1, the crane 2 may include a first angle adjuster attachment 6 coupled to the mast 4 and a second angle adjuster attachment 8 coupled to the first end 10 of the boom 12. The angle adjuster attachments may be welded, bonded through an adhesive, bolted, or otherwise respectively fixed to the mast 4 and the boom 12. In other implementations, the angle adjuster attachments may be formed as part of the mast and boom. The crane 2 may include an angle adjuster coupled to and between each of the first angle adjuster attachment 6 and the second angle adjuster attachment 8. In various implementations, a pin may secure the angle adjuster to the first angle adjuster attachment 6 and a second pin may secure the angle adjuster to the second angle adjuster attachment 8. The angle adjuster may be similar to or the same as any type of angle adjuster disclosed in U.S. Pat. No. 9,630,816. In particular implementations, the angle adjuster may be a ratchet binder angle adjuster.

Figure 4:
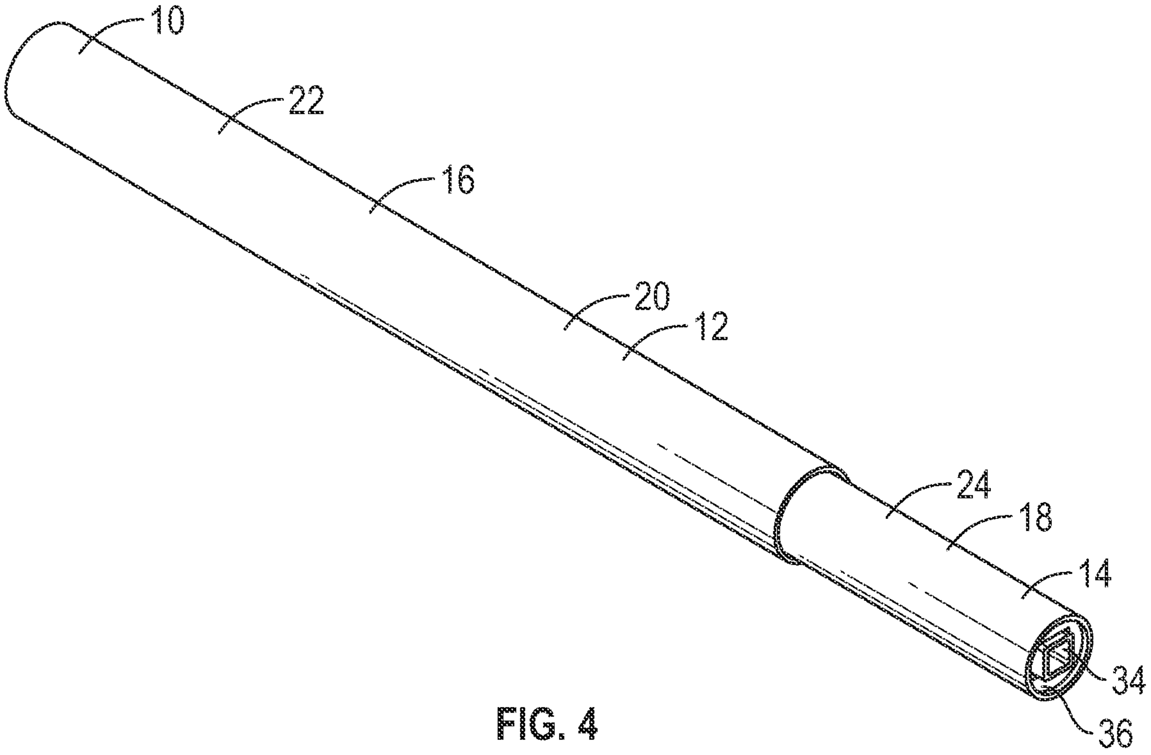
FIG. 4 is perspective view of the boom of the crane.

Still referring to FIG. 1, the crane includes a boom 12 coupled to the mast 4. The boom 12 may include any material disclosed herein. The boom 12 includes a first end 10 and a second end 14. In various implementations, the boom 12 is telescoping. As used herein, telescoping is defined as configured to telescope in a manner that results in a lengthening or shortening of the boom 12 through portions of the boom collapsing within one another or extending from one another. Referring to FIG. 4, a perspective view of the boom of the crane is illustrated. As illustrated by FIGS. 1 and 4, the boom 12 includes a first portion 16 which is configured to fit over a second portion 18. Accordingly, when the boom 12 telescopes and is lengthened, the second portion 18 extends out and away from the first portion 16.

Figure 2:
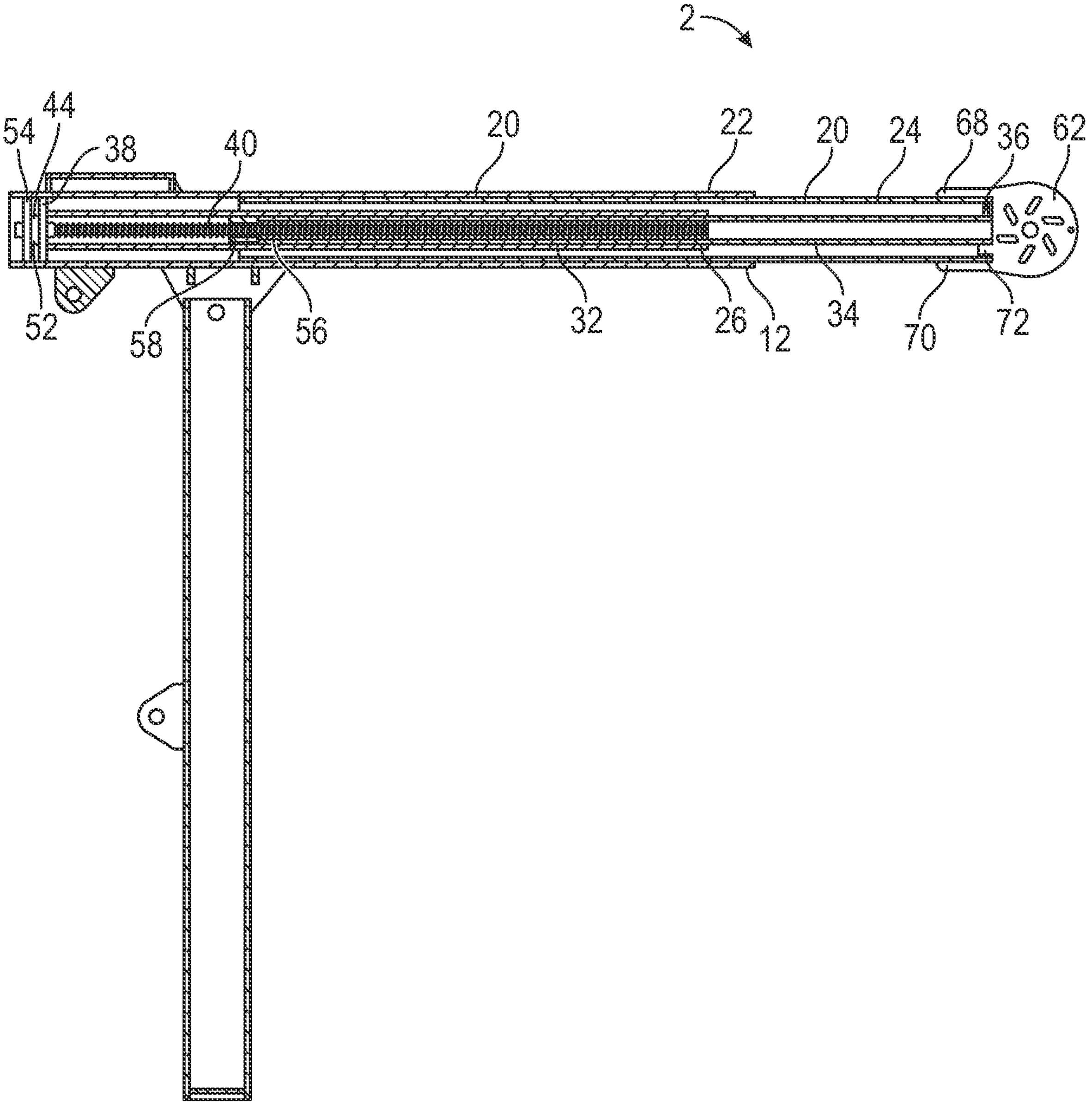
FIG. 2 is a cross sectional side view of the crane.
Figure 3:
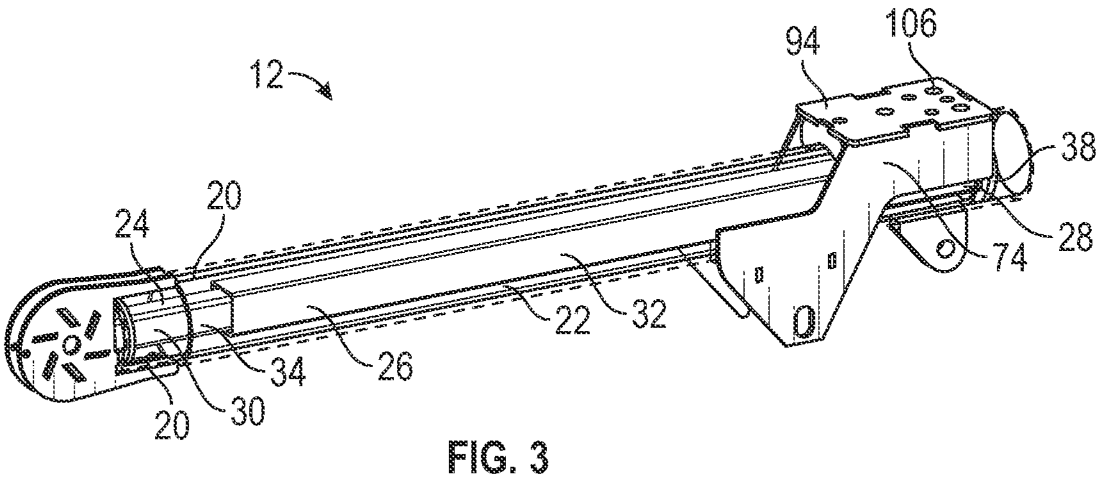
FIG. 3 is a semi-transparent perspective view of the boom of the crane.

Still referring to FIGS. 1 and 4, the boom includes a first telescoping boom which is an outer telescoping boom 20. Referring to FIG. 2, a cross sectional side view of the crane is illustrated. Referring to FIG. 3, a semi-transparent view of the boom of the crane is illustrated. As illustrated, the outer telescoping boom 20 forms the outer portion of the boom 12. The outer telescoping boom may include any type of material disclosed herein. As illustrated by FIGS. 2-4, the outer telescoping boom 20 includes a first outer sleeve 22 and a first inner sleeve 24. The first inner sleeve 24 is coupled within the first outer sleeve 22 and is configured to fit and to telescope within the first outer sleeve 22. In various implementations, the outer telescoping boom 20 may include a cylindrical tube shape, or a cross section of the outer telescoping boom may be circular. The outer boom of such implementations may have increased strength due to the circular shape of the outer boom and the outer boom not having a weld seam or other seam. In such implementations, the first inner sleeve 24, considered alone with the first outer sleeve 22, may be configured to translationally and rotationally move within the first outer sleeve 22. In other implementations, the outer telescoping boom, including the first inner sleeve and the first outer sleeve, may include a rectangular prism or rectangular tube shape.

Figure 5:
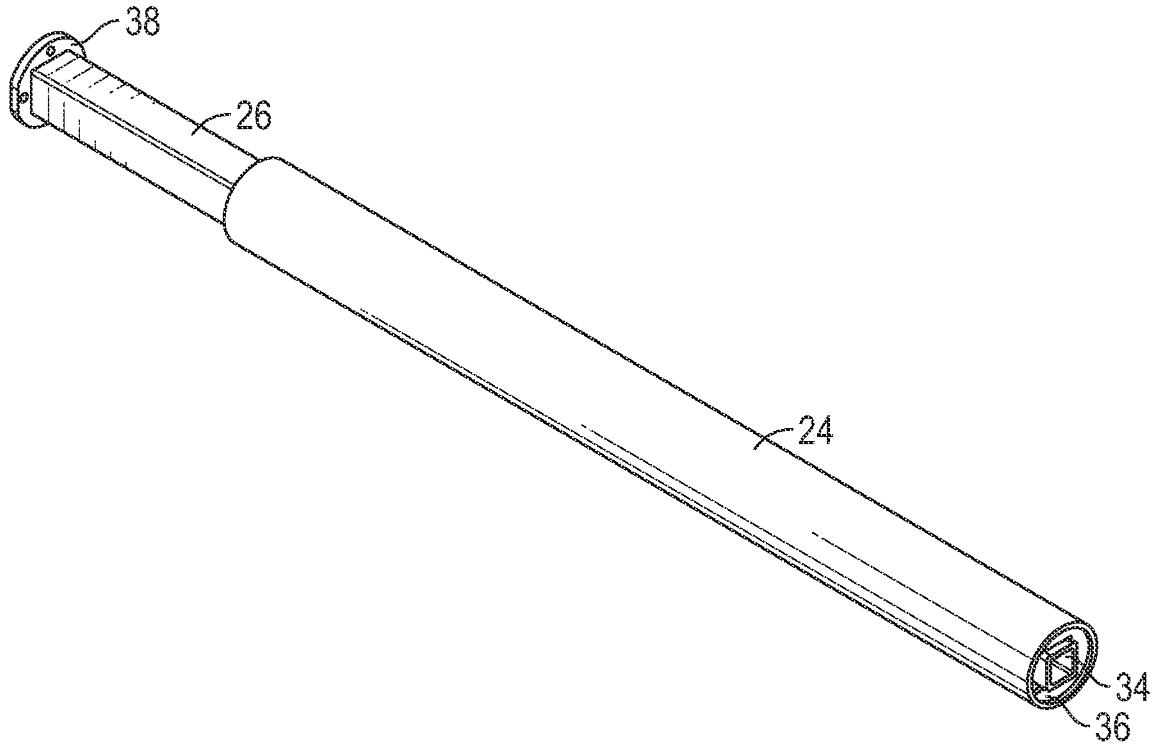
FIG. 5 is a perspective view of a portion of the outer telescoping boom of the boom of FIG. 4 over an inner telescoping boom.
Figure 6:
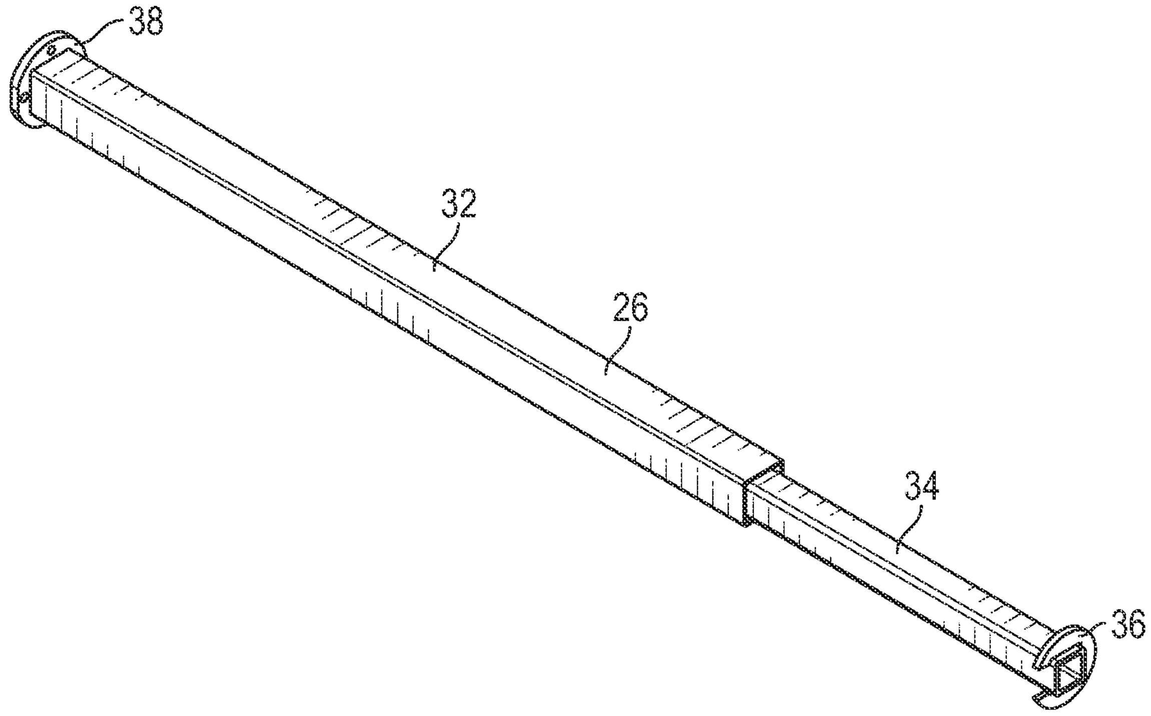
FIG. 6 is a perspective view of the inner telescoping boom of the crane.

In various implementations, and as illustrated by FIGS. 2-3, the crane includes a second telescoping boom, or an inner telescoping boom 26. The inner telescoping boom 26 is coupled within the outer telescoping boom 20. The inner telescoping boom may include any material disclosed herein. Referring to FIG. 5, a perspective view of a portion of the outer telescoping boom of the boom of FIG. 4 over an inner telescoping boom is illustrated. Similarly, referring to FIG. 6, a perspective view of the inner telescoping boom is illustrated. More specifically, FIG. 5 illustrates the boom 12 of FIG. 4 with the first outer sleeve 22 removed and FIG. 6 illustrates the boom 12 of FIG. 4 with both the first outer sleeve 22 and the first inner sleeve 24, or the outer telescoping boom 20, removed. Accordingly, as illustrated by FIGS. 2-6, in various implementations the inner telescoping boom 26 may be coupled entirely within the outer telescoping boom 20, even when the inner telescoping boom 26 is in a fully extended position. In such implementations, the inner telescoping boom 26 is not configured to telescope beyond a length of extension allowed by the outer telescoping boom 20 but is configured to telescope the same amount as the outer telescoping boom 20 when the crane 2 telescopes. Likewise, the maximum distance the crane 2 is configured to telescope is equal to a maximum distance the outer telescoping boom 20 is configured to telescope.

As illustrated by FIGS. 2-3, in various implementations nothing contacts the outer surface of the inner telescoping boom except at the first end 28 and the second end 30 of the inner telescoping boom 26. Accordingly, in such implementations nothing between the inner and outer telescoping boom interferes with the ability of the inner telescoping boom 26 or the outer telescoping boom 20 to telescope.

As clearly illustrated by FIG. 6, the inner telescoping boom 26 includes a second outer sleeve 32 and a second inner sleeve 34. In various implementations, the inner telescoping boom 26, and the second outer sleeve 32 and the second inner sleeve 34, may be rectangular tubes. Accordingly, a cross section of the inner telescoping boom 26 may be rectangular. In such implementations, the second inner sleeve 34 may be configured to fit within the second outer sleeve 32 and translationally move relative to the second outer sleeve 32, however, the second inner sleeve 34 may be rotationally fixed as it is unable to rotate within the second outer sleeve 32 due to the rectangular shape of the inner telescoping boom. In other implementations the inner telescoping boom may include a tube having a non-rectangular and non-circular shaped cross section, such as, by non-limiting example, an ovate shaped cross section. Such implementations may also rotationally fix the second inner sleeve to the second outer sleeve. In other implementations, the inner telescoping boom may include a cylindrical tube, or a tube having a circular cross section. In such implementations, either the inner telescoping boom 26 or the outer telescoping boom 20 may include a mechanism which prevents the second portion 18 of the boom 12 from rotating relative to the first portion 16 of the boom.

In various implementations, the second inner sleeve 34 is fixedly coupled to the first inner sleeve 24. As used herein, fixed is understood as meaning something unable to move relative to whatever it is fixed to. Accordingly, the second inner sleeve 34 cannot rotate or translationally move relative to the first inner sleeve 24. In various implementations, the second inner sleeve 34 may be fixed to the first inner sleeve 24 through an inner sleeve end plate 36, as illustrated by FIGS. 2 and 4-6. In various implementations, the first inner sleeve 24 and the second inner sleeve 34 may be fixed to the inner sleeve end plate 36 through, by non-limiting example, a weld, an adhesive, a bolt, a screw, or another fastening mechanism. In other implementations, the first inner sleeve 24 may include either slots, openings, protrusions, or a combination thereof, the second inner sleeve 34 may include either slots, openings, protrusions, or a combination thereof, and the inner sleeve end plate 36 may include either slots, openings, protrusions, or a combination thereof. In such implementations, the slots, openings, protrusions, or a combination thereof of the inner sleeve end plate 36 may engage corresponding slots, openings, protrusions, or a combination thereof of the first inner sleeve 24 and the second inner sleeve 34. The interaction between the slots or openings and the protrusions may fix the second inner sleeve 34 to the first inner sleeve 24.

Similarly, in various implementations, the first outer sleeve 22 may be fixedly coupled to the second outer sleeve 32. Accordingly, the second outer sleeve 32 cannot rotate or translationally move relative to the first outer sleeve 22. In various implementations, the second outer sleeve 32 may be fixed to the first outer sleeve 22 through an outer sleeve end plate 38, as illustrated by FIGS. 2-6. In various implementations, the first outer sleeve 22 and the second outer sleeve 32 may be fixed to the outer sleeve end plate 38 through, by non-limiting example, a weld, an adhesive, a bolt, a screw, or another fastening mechanism. In other implementations, the first outer sleeve 22 may include either slots, openings, protrusions, or a combination thereof, the second outer sleeve 32 may include either slots, openings, protrusions, or a combination thereof, and the outer sleeve end plate 38 may include either slots, openings, protrusions, or a combination thereof. In such implementations, the slots, openings, protrusions, or a combination thereof of the outer sleeve end plate 38 may engage corresponding slots, openings, protrusions, or a combination thereof of the first outer sleeve 22 and the second outer sleeve 32. The interaction between the slots or openings and the protrusions may fix the second outer sleeve 32 to the first outer sleeve 22.

In such implementations, because the first inner sleeve 24 and the second inner sleeve 34 are fixed relative to one another, and the first outer sleeve 22 and the second outer sleeve 32 are fixed relative to one another, the first outer sleeve 22 cannot rotate or translationally move relative to the second outer sleeve 32. Similarly, the first inner sleeve 24 cannot rotate or translationally move relative to the second inner sleeve 34. Further, in such implementations, because the inner sleeves are fixed to one another and the outer sleeves are fixed to one another, the outer telescoping boom 20, the inner telescoping boom 26, and the overall telescoping boom 12 must telescope together in the same amount.

Figure 7:
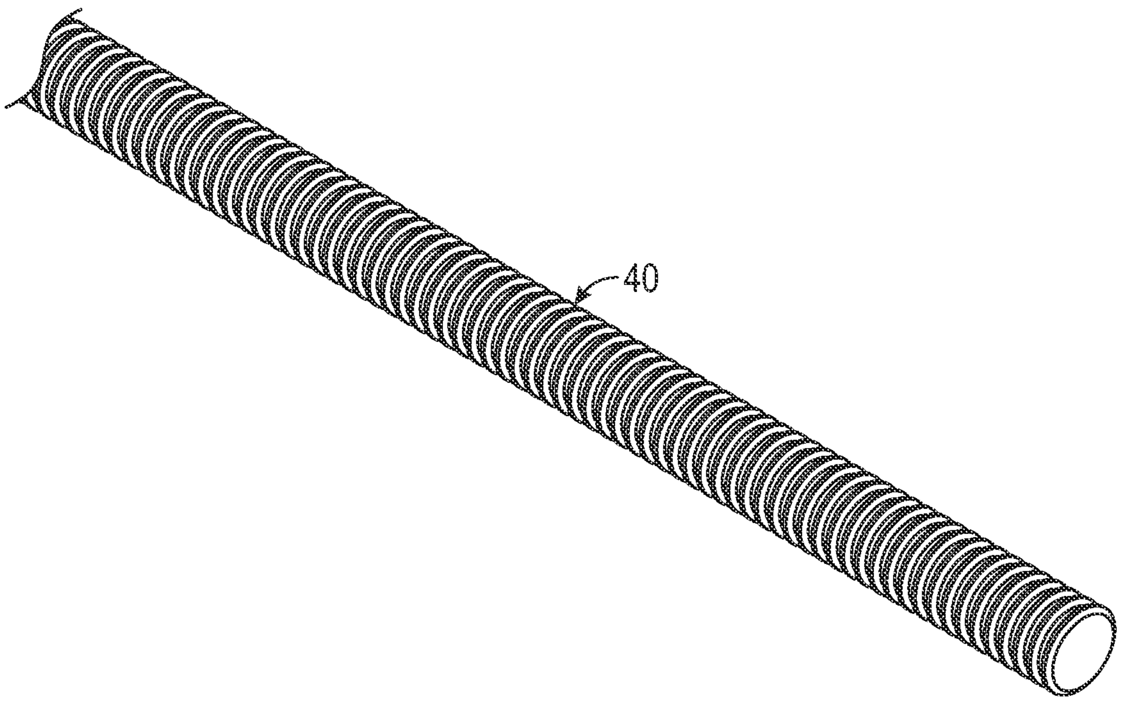
FIG. 7 is a perspective view of a portion of a threaded rod of the crane.
Figure 9:
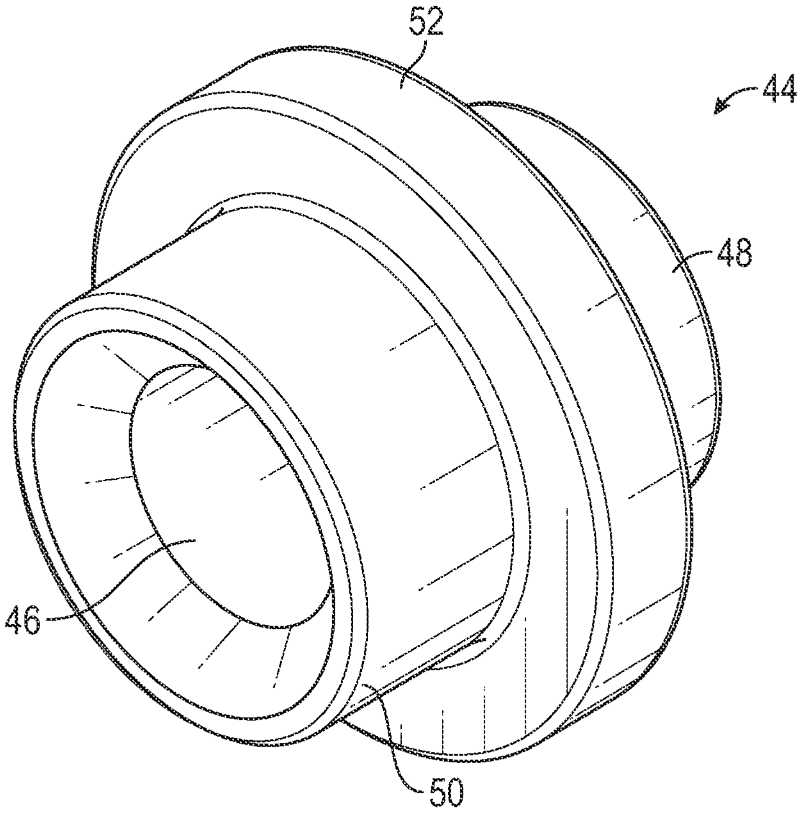
FIG. 9 is a perspective view of a nut of the crane.
Figure 10:
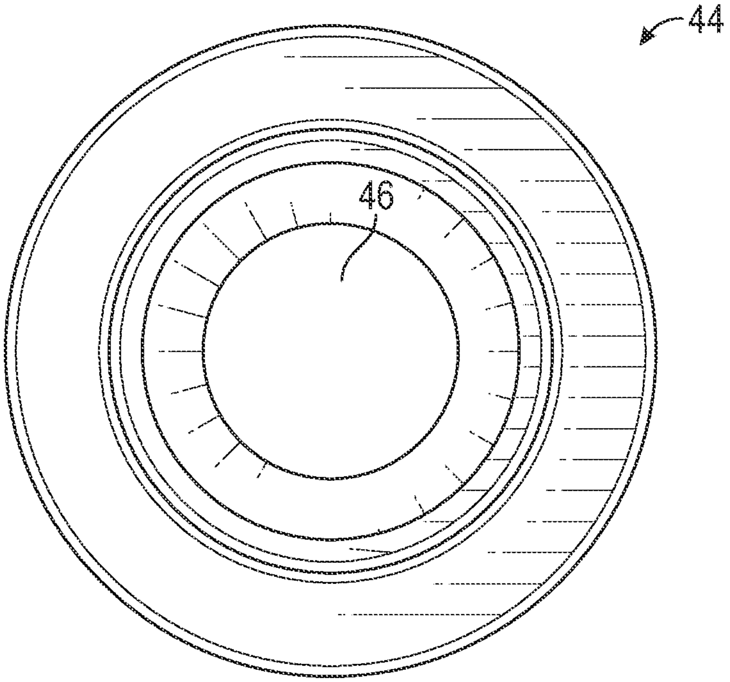
FIG. 10 is a rear view of the nut of FIG. 9.

Referring back to FIG. 2, the boom 12 comprises a threaded rod 40 rotatably coupled within the inner telescoping boom 26. Referring to FIG. 7, a perspective view of a portion of a threaded rod of the crane is illustrated. In particular implementations, the threaded rod may be an ACME threaded rod. The threaded rod may be made from any material disclosed herein. In various implementations, and as illustrated by FIG. 2, the threaded rod may be as long as or shorter than the second outer sleeve 32. In other implementations, the threaded rod may be longer than the second outer sleeve 32. In various implementations, the threaded rod 40 is secured to the first portion 16 of the boom 12 in a manner that fixes translational movement, but still allows rotational movement, of the threaded rod 40 relative to the first outer sleeve 22 and the second outer sleeve 32. In particular implementations, an end of the threaded rod 40 is fixed to a nut 44, as illustrated by FIG. 2. Referring to FIG. 9, a perspective view of a nut of the crane is illustrated, and referring to FIG. 10, a rear view of the nut of FIG. 9 is illustrated. In various implementations, an end of the threaded rod 40 is fixed to the nut 44, and may be fixed within the opening 46 of the nut 44. In such implementations, the threaded rod may be welded, fixed through an adhesive, or otherwise fixed to the nut 44. As illustrated by FIG. 9, the nut 44 may include a first end 48, a second end 50, and a middle ridge 52. In various implementations, and as illustrated by FIG. 2, the outer sleeve end plate 38 may be coupled over and around the first end 48 of the nut 44. In various implementations the crane 2 may also include a second outer sleeve end plate 54 directly coupled to the first outer sleeve 22 and the second outer sleeve 32. In such implementations, the second outer sleeve end plate 54 may be coupled over and around the second end 50 of the nut 44. In such implementations the nut 44 is free to rotate between the first outer sleeve end plate 38 and the second outer sleeve end plate 54. As illustrated by FIGS. 2 and 9, the nut 44 includes a middle ridge 52. The middle ridge 52 may be large enough that it is secured between the first outer sleeve end plate 38 and the second outer sleeve end plate 54. In such implementations, translational movement of the threaded rod in relation to the first outer sleeve 22 and the second outer sleeve 32 may be fixed. In various implementations, the first outer sleeve end plate 38 and the second outer sleeve end plate 54 may include ball bearings to facilitate rotation of the threaded rod 40, the nut 44 may include ball bearings to facilitate rotation of the threaded rod 40, or both the end plates and the nut 44 may include ball bearings to facilitate rotation of the threaded rod.

Figure 8:
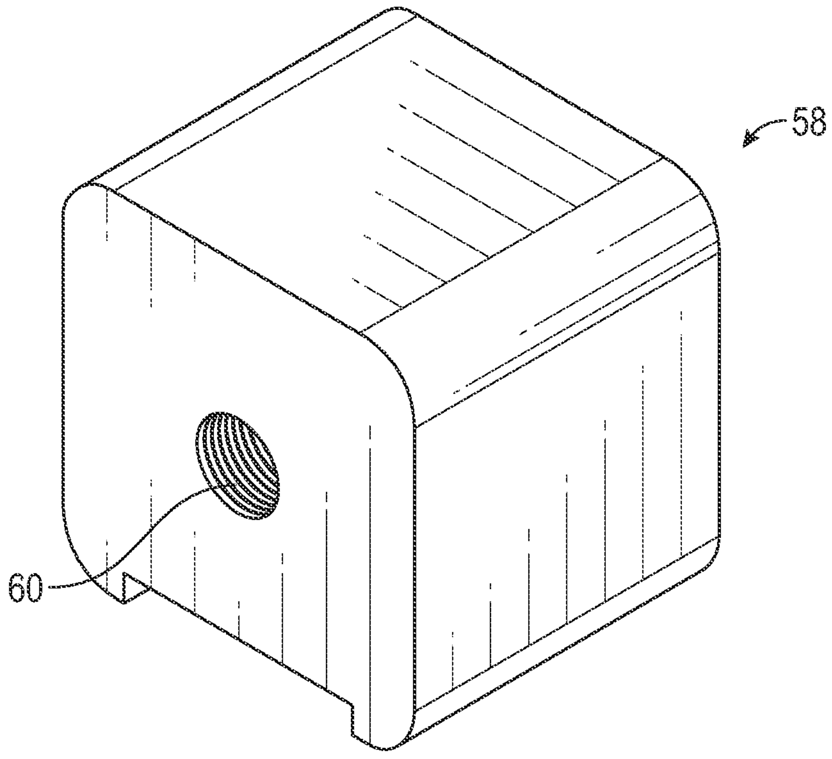
FIG. 8 is a perspective view of a threaded nut of the crane.

Referring to FIG. 2, in various implementations the crane 2 includes a threaded nut 58 fixedly coupled to the end 56 of the second inner sleeve 34 opposite the end of the sleeve directly coupled to the inner sleeve end plate 36. In other implementations, the threaded nut may be directly coupled to another portion of the second inner sleeve 34 other than the end 56. In various implementations, the threaded nut 58 may be coupled within the second inner sleeve 34 and/or to the end 56 of the second inner sleeve 34. Referring to FIG. 8, a perspective view of the threaded nut is illustrated. As illustrated, in various implementations the threaded nut 58 includes a threaded opening 60 through the threaded nut 58. In such implementations, the threads of the threaded opening 60 correspond to the threads of the threaded rod 40.

In various implementations, the threaded rod 40 is threaded through and coupled within the threaded nut 58. In such implementations, the nut 34 may move along the length of the threaded rod as the threaded rod rotates. In implementations where the threaded nut 58 is fixed to the second inner sleeve 34, and the second inner sleeve is fixedly coupled to the first inner sleeve 24, the rotation of the threaded rod 40 may cause the threaded nut 58 to translationally move, and in turn, the second inner sleeve 34, the first inner sleeve 24, and the second portion 18 of the telescoping boom may telescope in a retracted or expanded manner, depending on the direction of rotation of the threaded rod 40. In the implementations illustrated herein, because the inner telescoping boom 26 is a rectangular tube, the inner telescoping boom cannot rotate with rotation of the threaded rod 40 in the threaded nut 58. Accordingly, the shape of the inner telescoping boom restricts the rotational movement of the second portion 18 of the boom 12 and allows translational movement of the second portion 18 of the boom 12.

In various implementations, the threaded rod may include a stop at the end of the rod to prevent the threaded nut 58 from moving off of the threaded rod 40. In other implementations, either the inner telescoping boom or the outer telescoping boom may include a stop to prevent the threaded nut 58 from moving off of the threaded rod 40. In various implementations, a receiver may be coupled to the threaded rod 40 at the first end 10 of the boom 12. The receiver may be configured to turn the threaded rod and either telescope the boom 12 in an extended or contracted manner. The receiver may be hand powered or powered by a motor. In particular implementations, the receiver may be configured to be powered by a hand-held drill.

In the implementations disclosed herein, the threaded rod 40, the inner telescoping boom 26, and the outer telescoping boom 20 may all strengthen the structure of the boom 12 of the crane. Further, the implementations disclosed herein having the outer telescoping boom, the inner telescoping boom and the threaded rod within the inner telescoping boom allow for the crane to telescope in or out safely while under a load. In various implementations, the amount of weight the crane may be rated for may vary depending on the length of the boom. Accordingly, when the boom is in a fully extended position it may be able to handle less weight than when the boom is in a shortened position. In various implementations, the outer surface of the first inner sleeve 24 may be marked with different weights along the length of the first inner sleeve, indicating to a user of the crane the amount of weight that the crane can support depending on the length of the boom 12.

In the implementations disclosed herein, the outer telescoping boom 20 and the inner telescoping boom 26 may prevent debris from interfering with the rotation of the threaded rod, allowing the crane to telescope smoothly.

Referring back to FIG. 1, in various implementations the crane 2 includes a sheave 62 coupled to the second end 14 of the boom 12. In various implementations, the sheave may include a first plate 64 and a second plate 66, with a wheel between the first plate 64 and the second plate 66. In such implementations, a pin may be inserted through the first plate 64, the wheel, and the second plate 66. As illustrated by FIG. 1, in various implementations the first plate 64 and the second plate 66 may each include an upper extension 68 and a lower extension 70. The second end of the boom may be coupled between the upper extension 68 and the lower extension 70. In various implementations, as illustrated by FIG. 2, the sheave may include a middle extension 72 configured to extend into the boom 12. The upper extension 68, the lower extension 70, and the middle extension 72 may be welded to the boom 12, bonded to the boom 12 through an adhesive, or otherwise fixed to the boom 12.

Figure 11:
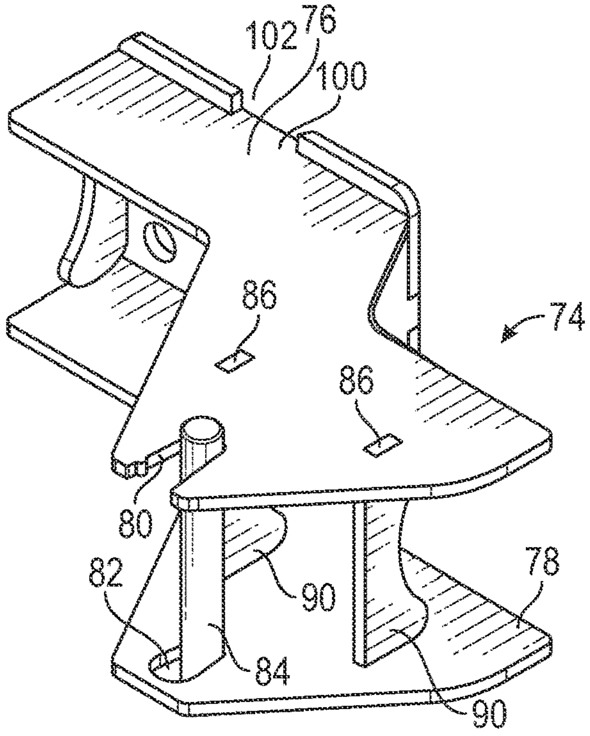
FIG. 11 is an isolated and perspective view of a boom support of the crane.

Referring back to FIG. 1, in various implementations the crane 2 includes a boom support 74 coupled to the mast 4 and the boom 12. In various implementations, the boom support 74 may be similar to the boom end housing of '816, the disclosure of which was previously incorporated herein by reference. While FIG. 1 illustrates a lower left sided perspective view of the boom support, FIG. 3 illustrates an upper right sided perspective view of the boom support. Referring to FIG. 11, an isolated and a perspective view of the boom support of the crane is illustrated. In various implementations, the boom support may be made from any material disclosed herein. As illustrated, the boom support may include a first side plate 76 and a second side plate 78. In various implementations, the first side plate may include a slot 80 and the second side plate 78 may include a closed opening 82. In other implementations, the first side plate 76 may include the closed opening and the second side plate 78 may include the slot, and in still other implementations, both the first side plate 76 and the second side plate 78 may both include closed openings. In various implementations, the boom support may include a pin 84 configured to extend through the mast 4 of the crane and to be received by the first side plate 76 and the second side plate 78. The pin 84 may couple the boom support 74 to the mast 4. In various implementations, the pin 84 may be fixedly coupled to the mast and extend beyond either end of the mast, while in other implementations the pin may be formed as part of the mast. In implementations having the pin 84 coupled to the mast, a single individual may couple the boom fixed to the boom support 74 to the mast. In such implementations, the individual would position the boom over and perpendicular to the mast. The individual may rotate the boom to allow closed opening 82 to extend over the end of pin 84. In particular implementations, the boom may be rotated approximately 45 degrees to allow the closed opening 82 to extend over the pin 84. The individual may then rotate the boom to allow the slot 80 to fit over the opposing end of the pin 84. In such implementations, the boom may be coupled to the mast through the boom support without the use of any moving pieces, such as latches or springs. The individual may then secure the boom to the mast through coupling an angle adjuster to the boom and the mast. In such implementations, the angle adjuster coupled to the boom and the mast may prevent rotation of the boom which would remove the pin 84 from the slot 80. In other implementations, the pin 84 may be locked in place through a locking mechanism, such as a cotter pin, clip, or other locking mechanism. In various implementations, the first side plate 76 and the second side plate 78 may include openings 86 configured to receive protrusions 88 of the lower boom supports 90. In various implementations, the lower boom supports may be fixed to the boom using any method disclosed herein, including through a weld or an adhesive.

Figure 12:
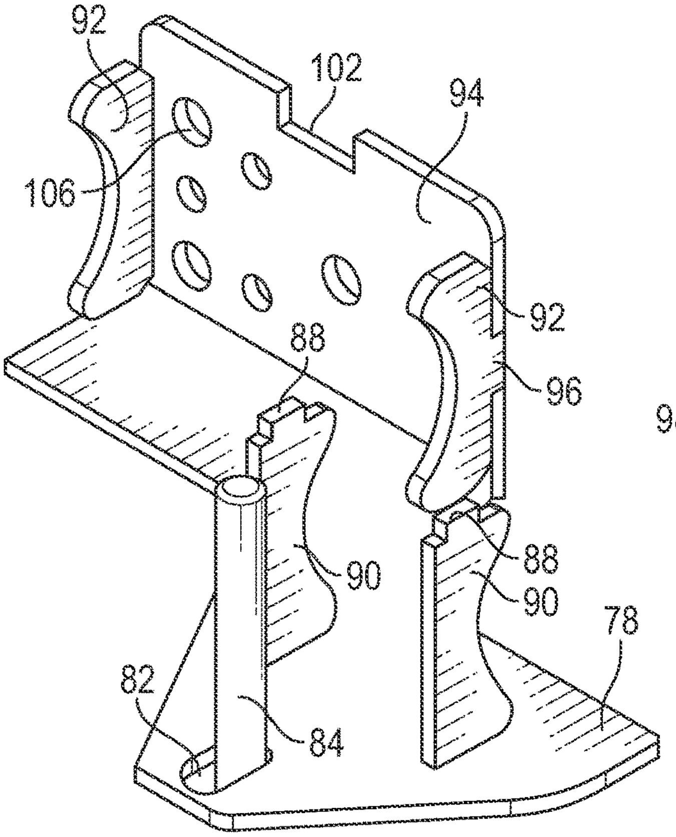
FIG. 12 is a perspective view of the boom support of FIG. 11 missing a side plate.
Figure 13:
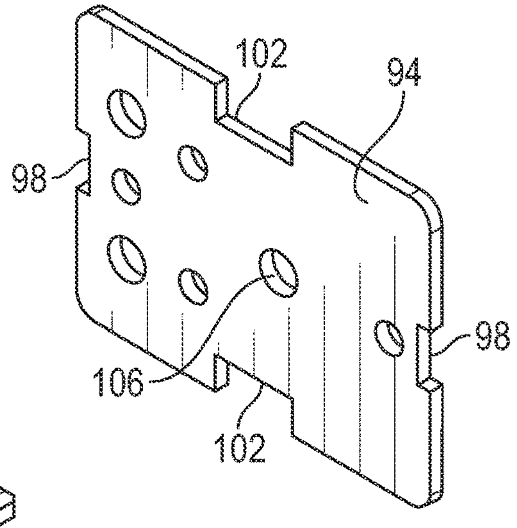
FIG. 13 is a perspective view of the top plate of the boom support of FIGS. 11-12.

Referring to FIG. 12, a perspective view of the boom support of FIG. 11 with the first side plate removed is illustrated. As illustrated, in various implementations the boom support 74 may include upper boom supports 92. The boom support 74 may also include a top plate 94. Referring to FIG. 13, a perspective view of the top plate of the boom support of FIGS. 11-12 is illustrated. In various implementations, the upper boom supports 92 may include protrusions 96 configured to be received by slots 98 in the top plate 94. In various implementations, the upper boom supports 92 may be fixed to the boom using any method disclosed herein. As illustrated by FIG. 11, the first side plate 76 and the second side plate 78 may include protrusions 100 configured to fit into corresponding slots 102 within the top plate. In various implementations, the first side plate 76, the second side plate 78, the lower boom supports 90, the upper boom supports 92, and the top plate 94 may be coupled together through welds, adhesive, or any other mechanism disclosed herein. The protrusions within the boom support and the corresponding openings and slots may strengthen the structure of the boom support and may facilitate assembly of the boom support.

In various implementations, and as illustrated by FIGS. 3 and 12-13, the top plate 94 may include openings therethrough configured to allow a winch to be coupled and/or directly coupled to the top plate 94.

While the implementations disclosed herein illustrate the boom support not rotatable relative to the mast (as illustrated by FIG. 1), in other implementations the boom support may be rotatable relative to the mast using any method and/or structure disclosed in '816.

In places where the description above refers to particular implementations of cranes and implementing components, sub-components, methods and sub-methods, it should be readily apparent that a number of modifications may be made without departing from the spirit thereof and that these implementations, implementing components, sub-components, methods and sub-methods may be applied to other cranes.

What is claimed is:

1. A crane comprising:

a mast coupled to an outer telescoping boom;

an inner telescoping boom coupled within the outer telescoping boom, wherein the inner telescoping boom comprises an inner sleeve coupled within an outer sleeve; and a threaded rod rotatably coupled within the inner telescoping boom;

wherein a maximum distance the crane is configured to telescope is equal to a maximum distance the outer telescoping boom is configured to telescope.

2. The crane of claim 1, further comprising a sheave coupled to the outer telescoping boom.

3. The crane of claim 1, wherein the outer telescoping boom is configured to telescope a same amount as the inner telescoping boom when the crane telescopes.

4. The crane of claim 1, wherein the crane is configured to telescope under a load.

5. The crane of claim 1, wherein the mast, the outer telescoping boom, and the inner telescoping boom comprise metallic materials.

6. The crane of claim 1, wherein the crane is a davit crane.

7. A crane comprising:

a mast coupled to an outer telescoping boom, the outer telescoping boom comprising an inner sleeve non-rotatably coupled within an outer sleeve; and an inner telescoping boom coupled within the outer telescoping boom, the inner telescoping boom comprising an inner sleeve non-rotatably coupled within an outer sleeve; and a threaded rod coupled within the inner telescoping boom;

wherein a maximum distance the inner telescoping boom is configured to telescope is equal to a maximum distance the outer telescoping boom is configured to telescope.

8. The crane of claim 7, wherein the further comprising a threaded rod is coupled within a threaded nut within the inner sleeve of the inner telescoping boom.

9. The crane of claim 7, wherein the crane is configured to telescope through rotation of the threaded rod.

10. The crane of claim 7, wherein the crane is configured to telescope under a load.

11. The crane of claim 7, further comprising a boom support, wherein the outer telescoping boom is coupled within the boom support.

12. The crane of claim 7, wherein a cross section of the outer telescoping boom is circular.

* * * * *